United States Patent
Shipp et al.

(10) Patent No.: US 7,490,079 B2
(45) Date of Patent: Feb. 10, 2009

(54) CLIENT SIDE INDEXING OF OFFLINE ADDRESS BOOK FILES

(75) Inventors: Neil L. Shipp, Bellevue, WA (US); Victor Erwin Romano, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 419 days.

(21) Appl. No.: 11/105,719

(22) Filed: Apr. 14, 2005

(65) Prior Publication Data

US 2006/0235878 A1    Oct. 19, 2006

(51) Int. Cl.
*G06F 17/30* (2006.01)
(52) U.S. Cl. ............... 707/2; 707/7; 707/102; 707/201; 709/217
(58) Field of Classification Search ............ 707/3, 707/201, 200, 1, 2, 101, 102, 202; 709/206
See application file for complete search history.

(56) References Cited

U.S. PATENT DOCUMENTS

| | | | |
|---|---|---|---|
| 5,966,714 A | 10/1999 | Huang et al. | |
| 6,148,329 A * | 11/2000 | Meyer | 709/206 |
| 6,389,386 B1 * | 5/2002 | Hetherington et al. | 707/7 |
| 6,457,879 B1 | 10/2002 | Thurlow et al. | |
| 6,829,607 B1 | 12/2004 | Tafoya et al. | |
| 7,194,506 B1 * | 3/2007 | White et al. | 709/203 |
| 2001/0029455 A1 | 10/2001 | Chin et al. | |
| 2002/0049610 A1 * | 4/2002 | Gropper | 705/1 |
| 2002/0198951 A1 | 12/2002 | Thurlow et al. | |
| 2003/0093483 A1 * | 5/2003 | Allen et al. | 709/206 |
| 2003/0149776 A1 * | 8/2003 | Tsunezumi | 709/228 |
| 2005/0108344 A1 | 5/2005 | Tafoya et al. | |
| 2006/0080303 A1 * | 4/2006 | Sargent et al. | 707/3 |
| 2006/0080393 A1 * | 4/2006 | Cardone et al. | 709/206 |
| 2006/0168344 A1 * | 7/2006 | Tsuchiya | 709/245 |

OTHER PUBLICATIONS

Kahn, M., "UTF-8 and Unicode FAQ for Unix/Linux," Published 1999, 32 pages, http://www.cl.cam.ac.uk/~mgk25/unicode.html.
"Microsoft Internet Explorer 6 Public Preview Release Notes," Published 2001, pp. 1-9, http://www.activewin.com/articles/2001/ie6rdme.shtml.

* cited by examiner

*Primary Examiner*—Shahid A Alam
*Assistant Examiner*—Rezwanul Mahmood
(74) *Attorney, Agent, or Firm*—Merchant & Gould P.C.

(57) ABSTRACT

A method of building an offline address book (OAB). An OAB data file and a table of attributes are generated at a server. The data file and table are transferred from the server to a client. The transferred data file and table are indexed by the client.

16 Claims, 5 Drawing Sheets

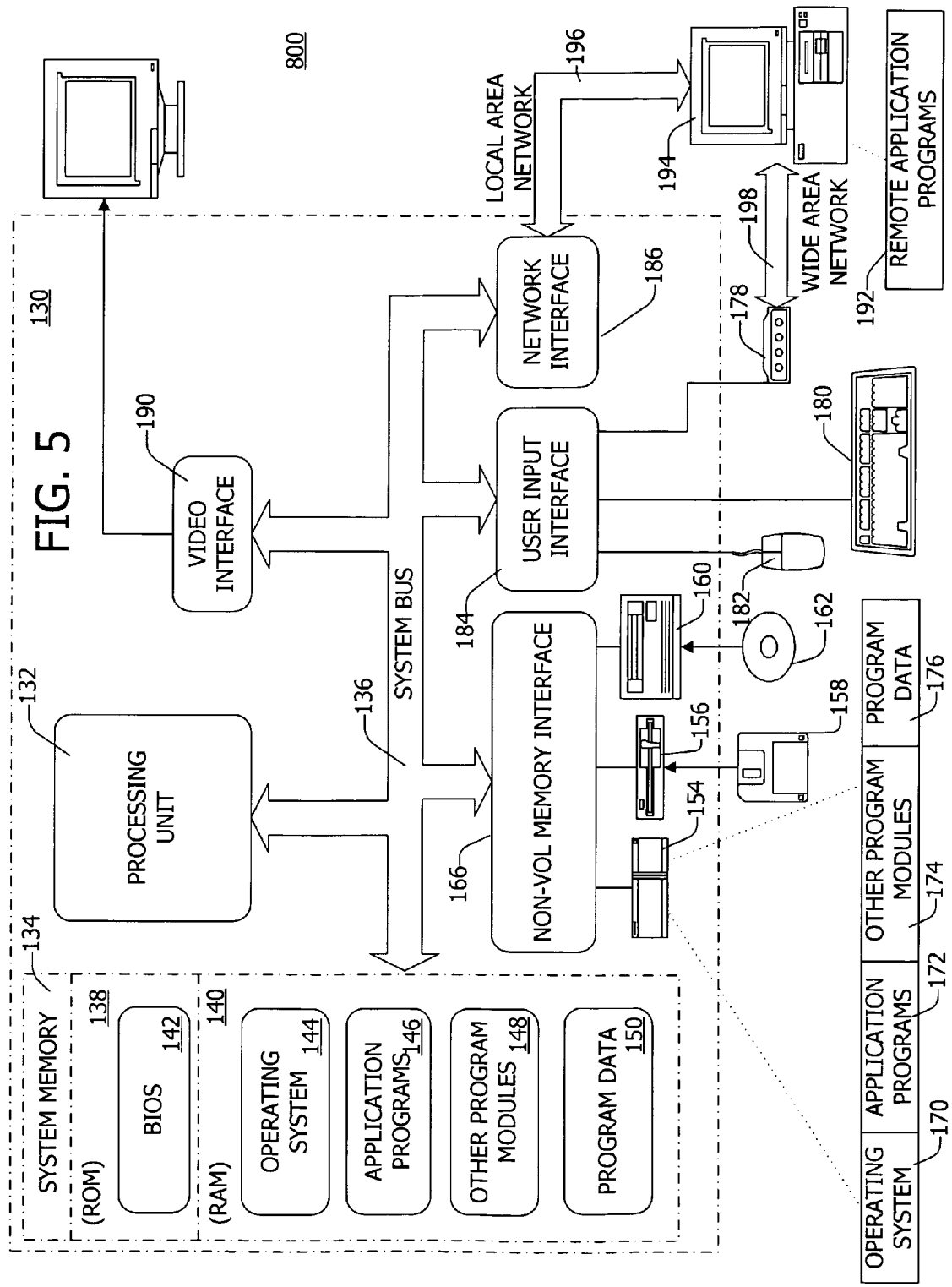

CLIENT SIDE INDEXING OF OFFLINE ADDRESS BOOK FILES

TECHNICAL FIELD

Embodiments of the present invention relate to the field of address books. In particular, embodiments of this invention relate to maintaining and indexing offline address books on a client side device.

BACKGROUND OF THE INVENTION

In previous versions of an offline address book (OAB) (such as the address book feature of Exchange Server and Outlook), the index files were generated on the server at the same time the data files were generated. Index files presented sorted views of the offline address book and were tied to one version of the full OAB data file (e.g., the particular version of the data files being indexed.

One problem was that different languages sort words and text differently than others. In order to support multiple client languages, a server generated a different set of index files for each client sort locale. For example, the Exchange Server architecture only supported generating one client locale on any one server for an OAB so multiple servers would be deployed to generate multiple client sort locales. The administrator would then need to ensure that the proper code-pages and language packs were installed on the server for each client language. There is a need to find a way to index the OAB so that the administrator no longer needs to deploy multiple servers nor do the language packs for each language need to be installed.

Another problem resulted from differential updates such as the differential update mechanism introduced in Exchange Server 5.5. Differential updates allow the client copies of the OAB and index files to be incrementally updated from the previous version. Updating the index files is a difficult problem to do efficiently and optimally, so the final design resulted in data structures that would become unbalanced and inefficient after a large number of updates. There is a need for indexing the data files after each OAB update so that the resulting index files will always be efficient and well balanced.

Also, server based designs of the OAB tend to limit future growth of the OAB. Small changes have been applied many times to work around these limits, but it still has some problems.

There is a need for a new OAB format that will overcome many if not all of the current limitations of the OAB design.

Accordingly, a system and method for maintaining and indexing address books is desired to overcome one or more of these and other disadvantages.

SUMMARY OF THE INVENTION

According to one embodiment, the client sorts the records and builds the index files of the OAB. Previously the server was responsible for that task and using a differential algorithm to update the index files on the client was difficult to implement efficiently. By moving the task to the client, one set of files can now be used by all clients regardless of sort order required by the client. By building the index files on the client, each client can customize their experience without requiring a custom index file on the server. New attributes can be added or removed from index files or different index behavior can be achieved without server side changes.

In one form, the invention comprises a method of building an offline address book (OAB). An OAB data file and a table of attributes are generated at a server. The data file and table are transferred from the server to a client. The transferred data file and table are indexed at the client.

In another form, the invention comprises a client-side method of building an offline address book (OAB) wherein a server generates an OAB data file and a table of attributes. The data file and table are received by the client from the server. The transferred data file and table are indexed at the client.

In another form, the invention comprises a method of maintaining an offline address book (OAB). An OAB data file and a table of attributes are periodically generated at a server. A differences file between the previous version and the next version of the OAB file is generated using an update mechanism. The difference file is transferred to a client which previously received the previous version. The transferred data file and table and difference file are indexed at the client.

Alternatively, the invention may comprise various other methods and apparatuses.

Other features are in part apparent and in part pointed out hereinafter.

BRIEF DESCRIPTION OF THE DRAWINGS

FIG. 5 is a block diagram illustrating one example of a suitable computing system environment in which the invention may be implemented.

Corresponding reference characters indicate corresponding parts throughout the drawings.

DETAILED DESCRIPTION OF THE INVENTION

Figure 1:
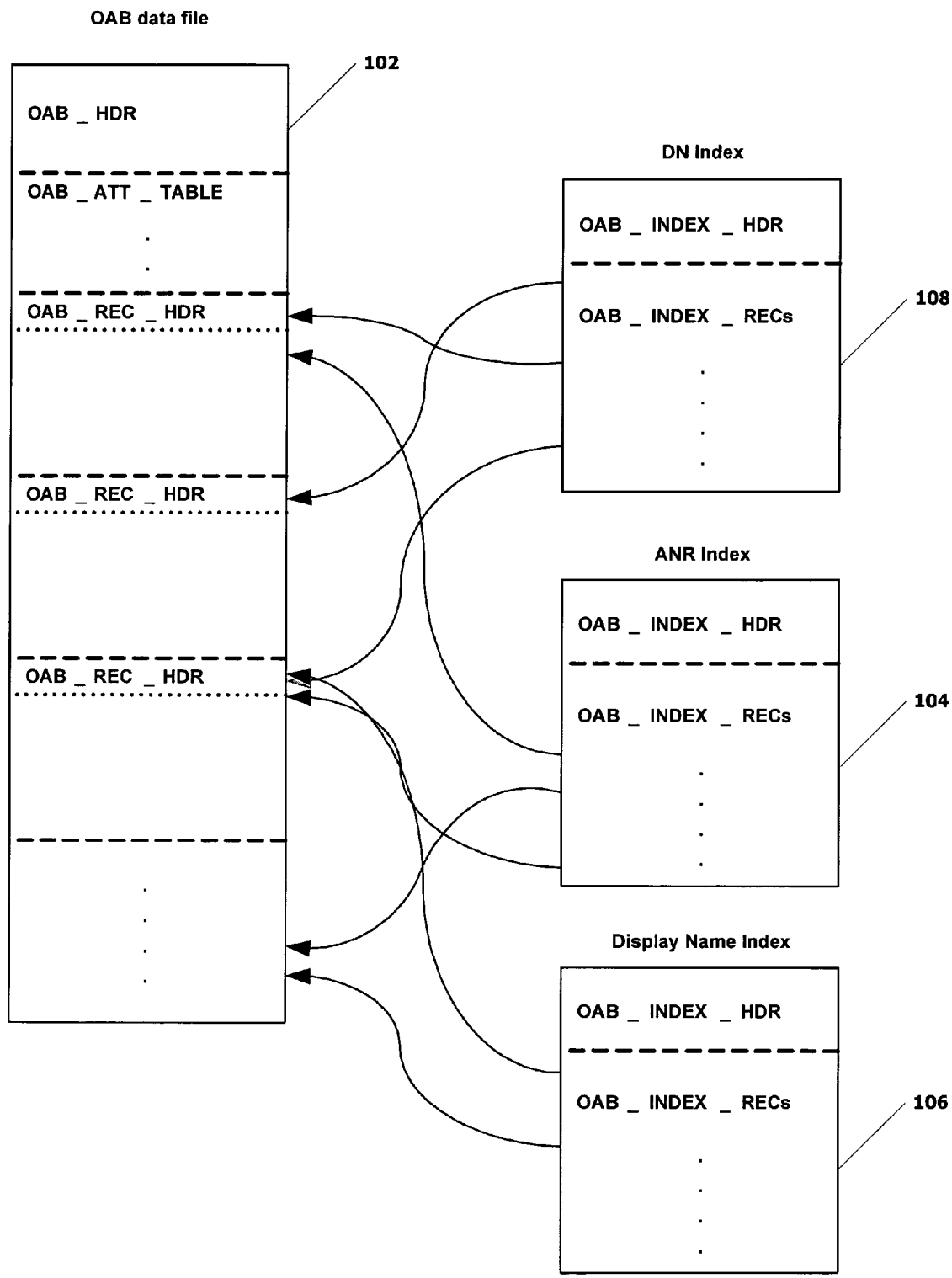
FIG. 1 is a block diagram of an exemplary embodiment of an OAB data file set according to the invention.

Referring to FIG. 1, client side indexing for an OAB begins with the server generating an OAB data file 102 that contains all the mail recipient address book data. Along with this data, there exists a table of attributes that the server or administrator has determined be indexed.

Examples of indexed attributes:

ANR or Ambiguous Name Resolution index file 104, including one or more of the following: Display Name, Surname, Mail Nickname (alias), and/or Office location.

Browse Index File such as a Display Name index file 106 (used to show the records in alphabetical order when listed).

Distinguished Name index file 108 (used to find records based on their unique distinguished names).

After the client has updated its local copy of the OAB data file 102 (either by downloading a full new file or updating the existing file), the client indexes the local data file according to the table of indexable attributes and the client's sort locale.

The index files 102 tend to change dramatically due to small changes in the data files so the size of the update files is not that much smaller than the size of the entire new index file. One advantage of client indexing is that by calculating the index files on the client, only the changed records needed to be transmitted to the client and not the large amount of changes to the index files.

A separate index file is built for each index that the client wants to use. In one embodiment as illustrated in FIG. 1, a display name index file 106 is built from the OAB data file 102 for the display name attribute so that the OAB can be viewed in sorted order. Optionally, a different index file is built for a virtual Ambiguous Name Resolution (ANR) attribute, e.g., ANR index 104, that indexes all the values for all properties that are marked with the ANR flag. This file allows searches to be quickly performed over numerous attributes without requiring multiple search operations. Optionally, another index file is built for the distinguished name (DN) attribute, e.g., DN index 108, which is the primary key for all mail recipient records. This file allows conversion to and from entry-ids (the main identifier of a mail recipient record). Other index files can optionally be built by the client to make search operations faster for specific attributes in the OAB.

In index file systems in which the display name attributes and DN attributes are single valued, such as in the Windows® Active Directory schema, every object has a corresponding one in the OAB. In such systems, the DN index file 108 and the display name index file 106 will have as many records as there are in the OAB data file 102 and each index record will point to a unique record in the OAB file 102. In other index file systems, the number of index records may differ from the number of OAB records. Attributes may be optional or multi-valued so certain records may be unreferenced and others may be referenced multiple times.

Figure 2:
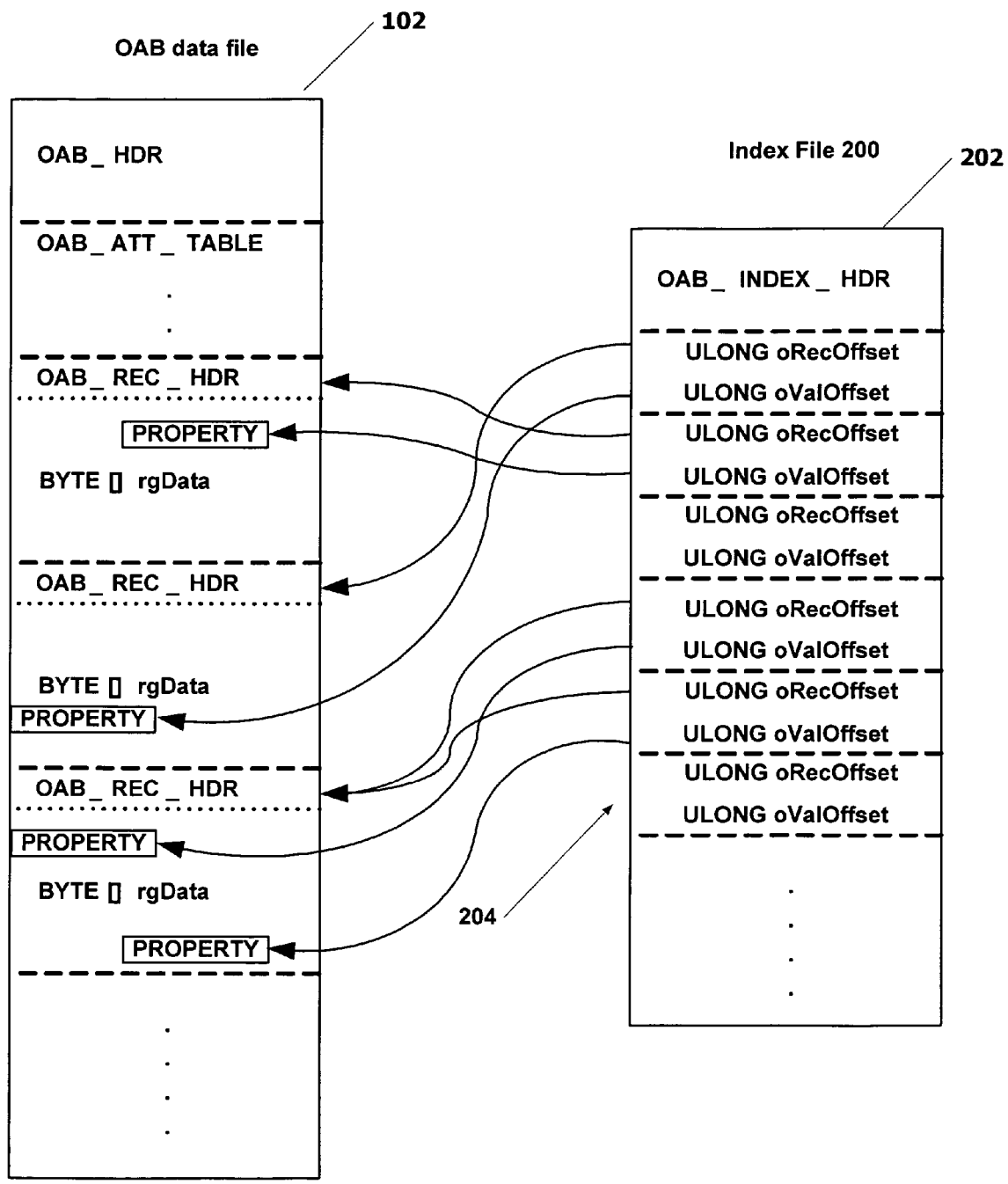
FIG. 2 is an exemplary block diagram illustrating the relationship between an OAB index file of a data file according to the invention.

In one embodiment as illustrated in FIG. 1 and also shown with some more detail in FIG. 2, each index file structure would be as follows. The start of each index file 200 (e.g., each of files 104, 106, 108) would begin with a header structure 202 (e.g., OAB_INDEX_HDR). The structure may include one or more of a version number, a signature value, a count of records, an attribute identifier and a sort locale. The version number is used to distinguish between different OAB file types and the signature is a hash value computed from the main OAB data file 102 so that the client can be certain that the file used as the index matches the full OAB data file 102. Following the header record is a list of fixed sized index records 204 (e.g., OAB_INDEX_RECs, ULONG oRecOffset, ULONG oValOffset). These records comprise a record offset into the OAB data file 102, plus an offset to the particular value within the referenced OAB data file record. For multi-valued attributes an index record is generated for each value stored in the OAB.

Index calculation would be accomplished by the client side as follows. Each index file can be built individually or all the files can be built at the same time. In one embodiment, the client reads the OAB data file 102 in order, reading each record, adding the attribute value to an in-memory table and, after the entire file is read, sorting the table, and writing out the index file. The client repeats this building process for each other attribute that needs indexing. More advanced implementations can be devised to only perform a single pass through the main OAB file and handle memory constraints on the client.

Index traversal is accomplished in the following way. To display the address book in order, the client chooses a starting position in the index file 102 to begin the list, reads each index record of index file 200 in order from the index file, and uses the offsets to read each OAB record in turn. Because the client uses the sorted index filed 200, the records come out in the correct sort order. To search for entries in an index file 102, a binary search may be performed. The client chooses the midpoint of the index file 102, retrieves the record pointed to by the record offset value, reads the value pointed to by the value offset, compares it with the search key and then chooses whether to bisect the upper range or lower range depending on the comparison result. The client then performs the operation again and again until the desired value is found or is determined to not be present.

The following illustrates one embodiment of the invention. In this embodiment, the terms noted in Table 1 have the indicated meaning:

TABLE 1

GLOSSARY

| Term | Definition |
| --- | --- |
| Diff | Differential update |
| OAB/OAL | Offline Address Book/Offline Address List |
| PDN | Parent Distinguished Name |
| RDN | Relative Distinguished Name |

The OAB format as generated by the server does not require the server generated index and browse files. All recipient data is stored in one file with no fixed order. Each record is self-contained and independent of any other record. It is up to the client to index the OAB file and generate ANR, browse, SMTP and RDN index files. No attempt at compressing file space is done to reduce often duplicated data such as common prefixes or postfixes (Legacy PDNs and SMTP domain names). Each string is written in full.

OAB Post Format

All OAB messages have at least the following properties set:

| Property name | Prop ID | Prop Type |
| --- | --- | --- |
| PR_OAB_SEQUENCE | 0x6801 | PT_LONG |
| PR_OAB_MESSAGE_CLASS | 0x6803 | PT_LONG |

The sequence number allows the client to determine if the post has been updated or added since the last time the client checked. The message class allows the client to distinguish Full OAB posts from Differential OAB posts.

Files are compressed using the binpatch library LZX compression routines. Compressed files can be decompressed using the binpatch library applypatch functions with an empty initial file.

Full OAB Post

Each OAB post with a full copy of the OAB has the PR_OAB_MESSAGE_CLASS property set to 0x01 and will have the following file attachments: 'data.oab', lngXXXX.oab (multiple) and macXXXX.oab (multiple) where XXXX is the hex language locale ID. The 'data.oab' file contains all of the OAB recipient data and the 'lngXXXX.oab' and 'macXXXX.oab' files contains the addressing and display template information. This list of files can be added to at any time and the client ignores files it does not understand.

The Post will also have the Following MAPI Properties Set:

| Property name | Prop ID | Prop Type |
| --- | --- | --- |
| PR_OAB_NAME | 0x6800 | PT_UNICODE |
| PR_OAB_SEQUENCE | 0x6801 | PT_LONG |
| PR_OAB_CONTAINER_GUID | 0x6802 | PT_UNICODE |

-continued

| Property name | Prop ID | Prop Type |
|---|---|---|
| PR_OAB_MESSAGE_CLASS | 0x6803 | PT_LONG |
| PR_OAB_DN | 0x6804 | PT_UNICODE |

The PR_OAB_NAME property contains the name of the Address List used to generate the OAB. This is the property that should be displayed to the client when choosing from multiple OABs to download.

The PR_OAB_SEQUENCE property contains an integer that keeps track of the number of times this OAB has been generated. Each generation increases this number by one and the same number is stamped on the Differential post and the Full post to allow the client to keep track of changes and determine which files are necessary to bring an OAB up to date via differential means.

The PR_OAB_CONTAINER_GUID property contains a graphical user interface display (GUID) that identifies the address list being generated. All posts that relate to the same address list have this GUID set to the same value. If the Address List is renamed causing the PR_OAB_NAME property to change, the GUID remains the same. The value is formatted as a hex encoded string and not as a binary type.

The PR_OAB_MESSAGE_CLASS property is set to 0x01 for all Full OAB messages to allow the client as well as the Exchange Store to distinguish full downloads from differential updates.

The PR_OAB_DN property contains the distinguished name of the Exchange Address List that corresponds to this OAB message.

Differential OAB Post

Each OAB post with a differential copy of the OAB will have the PR_OAB_MESSAGE_CLASS property set to 0x02 and will have the following file attachment: 'binpatch.oab', and may have one or more of the following template files: lngXXXX.oab (multiple) and macXXXX.oab (multiple) where XXXX is the hex language locale ID. This list of files can be added to at any time and the client should ignore files it doesn't understand.

The Post will also have the Following MAPI Properties set:

| Property name | Prop ID | Prop Type |
|---|---|---|
| PR_OAB_NAME | 0x6800 | PT_UNICODE |
| PR_OAB_SEQUENCE | 0x6801 | PT_LONG |
| PR_OAB_CONTAINER_GUID | 0x6802 | PT_UNICODE |
| PR_OAB_MESSAGE_CLASS | 0x6803 | PT_LONG |
| PR_OAB_DN | 0x6804 | PT_UNICODE |

The above properties are described in the previous section. For the PR_OAB_MESSAGE_CLASS property, it is set to 0x02 to allow the client and the Exchange store to detect that this is an OAB update message.

The server may include the template files in the differential message if it thinks the client should update its copy of the display templates. So if the client finds that the display or addressing templates it's using is included in the differential message it should update its own files. If the templates are not included, the client should continue to use the existing templates.

Availability of Updates

The OAB server will only post differential OAB messages when the contents of the OAB have changed from the previous version. This includes changes to template files. If no changes have occurred the server will repost the unchanged OAB files to the server using the same sequence number. This will stop the public folder server from expiring the OAB post.

The full uncompressed OAB data file format will consist of the following: the OAB header, the attribute table, and the OAB records. The header will follow the following format:

```
Struct OAB_HDR {
ULONG ulVersion;  // 32 for full file, 33 for index
ULONG ulSignature;
ULONG ulRecords;
};
```

The ulVersion field indicates the file type and is set to 32 decimal for the full OAB file. The ulSignature is a hash computed from the record data itself. The ulRecords field will give the total count of OAB records stored in the file.

Following the OAB_HDR is the attribute table. This includes OAB meta-data such as the properties included in the OAB data records along with the OAB meta-data record, which properties should be part of ambiguous name resolution (ANR), and which properties should be indexed.

The attribute table is stored as follows:

```
sturct OAB_META_DATA {
ULONG cbSize;
OAB_PROP_TABLE hdrAtts;
OAB_PROP_TABLE oabAtts;
};
struct OAB_PROP_TABLE {
ULONG cAtts;
OAB_PROP_REC rgProps[ ];
};
struct OAB_PROP_REC {
ULONG ulPropID;
ULONG ulFlags;
};
#define OAB_ANR_FLAG 0x01
#define OAB_RDN_FLAG 0x02
#define OAB_IDX_FLAG 0x04
```

The enclosing OAB_META_DATA structure contains two attribute tables plus a size member that describes the size of this section of the file in bytes. The arrays of OAB_PROP_REC structures is stored sequentially in the file so the start of the oabAtts section will follow immediately after the hdrAtts section in the file.

The hdrAtts section describes the format of the OAB properties record which is the first data record in the OAB file after the Attribute Table section. This section contains information such as the OAB name, DN, sequence number, ANR behavior and other information that the server wants to pass to the client outside of recipient data. This section is expandable and new data can be added by use of new property tags and values. Included are the PR_OAB_DN, PR_OAB_CONTAINER_GUID, PR_OAB_SEQUENCE and PR_OAB_NAME properties whose data is stored in the OAB properties record.

The oabAtts section describes the format of the OAB records for recipient data which follow the OAB properties record. For both the hdrAtts and oabAtts structures, it starts with a count of properties, cAtts, followed by cAtts number of OAB_PROP_REC structures. The OAB client code will use these tables to decode the OAB properties record and each OAB recipient record. The ulFlags member is used to determine if the attribute should be indexed, should be part of the ANR attribute set, or is a primary record key (RDN).

The client should make no assumption about the order of records in the attribute arrays. The properties may come in any order.

OAB Data Section

Figure 3:
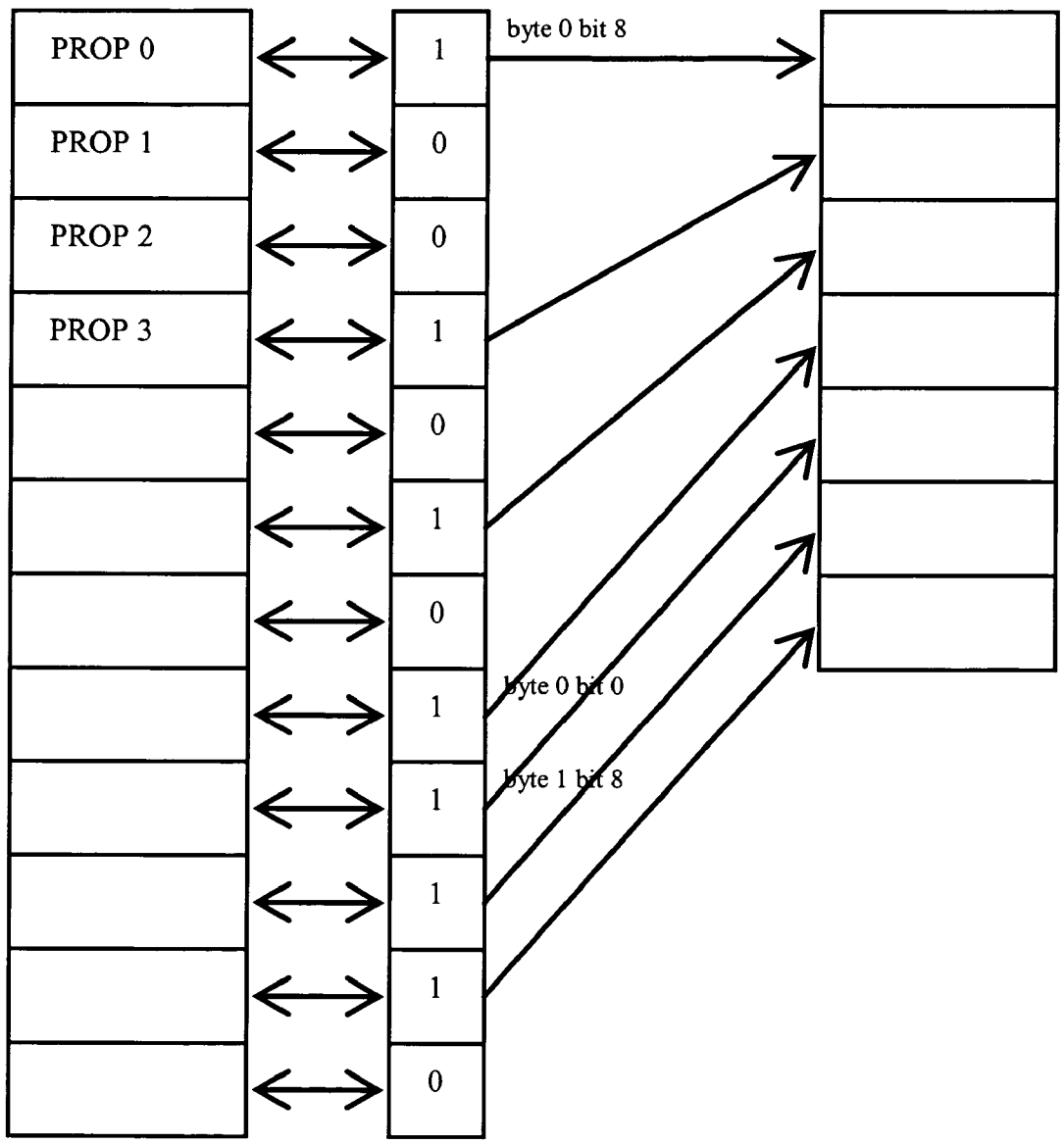
FIG. 3 is a block diagram illustrating the relationship between the property record (table), the presence bit array and the record data according to the invention.

FIG. 3 is a block diagram illustrating the relationship between the property record (table), the presence bit array and the record data.

Following the OAB attribute table is the OAB properties record and then the OAB recipient records. The number of recipient records is the same as ulRecords in the OAB_HDR section. There will only be one OAB properties record that represents meta-data about the OAB. Each record will start with a ULONG that specifies the number of bytes that is used to encode the values including the ULONG itself, and can be used as an offset to the next record in the file.

The next section of the record is a bit array that indicates the presence of specific properties in the record. The number of bytes that encode this bit array is equal to the cAtts count in the OAB_META_DATA record plus 7 divided by 8. So for a 37 attribute count, the number of bytes representing the bit field is 5. The bit array starts at the most significant bit of the first byte and continues through the rest of the bits of the first byte into the most significant bit of the second byte. Any unused bits of the last byte are set to 0.

The data for each property in the record is laid out in the same order that the attribute appears in the OAB_PROP_TABLE structure and the presence bit array. If a property is not present, the bit field will have a value of zero and no property value is encoded. Otherwise each value is laid out according to the property type part of the PropID. For single valued property types, PT_STRING8 properties are encoded as a null terminated string and in the format they are stored in the Active Directory. PT_UNICODE strings are stored as UTF8 null terminated strings. By default PT_STRING8 will only be used for strings that the AD stores as narrow strings. But if the AD stores the string as Unicode, the code page of the server is used to convert the string to MBCS. For PT_BINARY and all other types other than PT_BOOLEAN and PT_LONG, a length field as described in the next paragraph, followed by the specified number of bytes is stored in the file. For PT_BOOLEAN, a single byte will describe the value. 0=False and 1=True. For PT_LONG, the value is described the same way that a length field is encoded. A length or integer field is represented as a compacted byte array of 1 to 5 bytes. The leading byte will indicate the entire length if 127 bytes or smaller by having the value 0 through 127. If the high order bit of the first byte is set then the length of the length field is encoded in the 7 lower order bits. The length field is then encoded in little endian format in the next 1 to 4 bytes.

| Length or Integer encoding | Bytes |
| --- | --- |
| 0x00000000–0x0000007f | 0xXX |
| 0x00000080–0x000000ff | 0x81 0xXX |
| 0x00000100–0x0000ffff | 0x82 0xXXXX |
| 0x00010000–0x00ffffff | 0x83 0xXXXXXX |
| 0x01000000–0xffffffff | 0x84 0xXXXXXXXX |

The length field should use the format that uses the least number of bytes to encode, but it is not mandatory. For PT_LONG values, the server can compress the value by not encoding the non-zero upper bytes. Using this method the PT_LONG value 0x00000000 can be encoded as 0x00.

For multi-valued properties the value will first start with a length field as encoded above that encodes the number of values present in the attribute. This is followed by the indicated count of individual values encoded as single valued attributes above.

To find a property in the data record the code will first determine if the property is present using the presence bit array of the record. If marked as present, the code begins at the first present property, and using the property type field of the PropID, skip to the next present property in the record data, find the next present property type in the bit array and iterate until it finds the PropID it was looking for.

Property Truncation/Size Limiting

In order to stop the OAB from taking too much space on the client for degenerate cases, the OAB generation code will truncate overly long strings, remove overly long binary values, and limit the number of values in a multi-valued attribute. Information about which properties were truncated or removed is passed as a constructed multi-valued long property in the OAB record itself. The property PR_OAB_TRUNCATED_PROPS (0x6805, PT_MV_LONG) contains a list of the property tags that have been truncated or limited by the server. If no properties have been removed or limited, the attribute will not be present.

The PR_EMAIL_ADDRESS (LegacyExchangeDN) and PR_EMS_AB_HOME_MDB (Home-MDB) attributes will not be subject to property truncation or size limiting. The LegacyExchangeDN will not be limited because it is the property that uniquely identifies the object in the OAB and must be kept intact. The PR_EMS_AB_HOME_MDB attribute will also be kept intact because it is a calculated value that could often be quite long and must be kept intact for certain Outlook operations.

OAB Signature Generation

Figure 4:
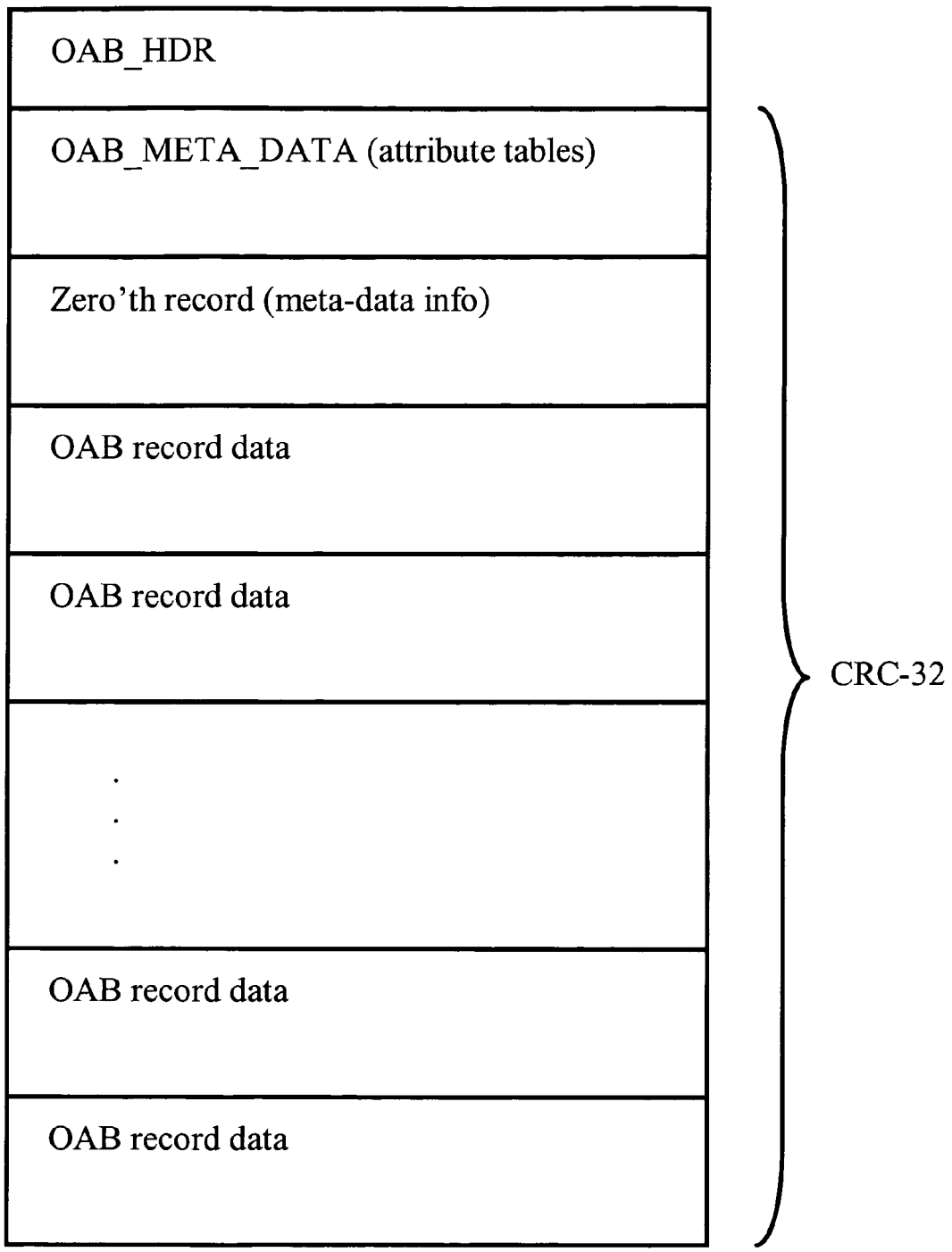
FIG. 4 is a block diagram illustrating an exemplary data structure for an OAB data file according to the invention.

FIG. 4 is a block diagram illustrating an exemplary data structure for an OAB data file according to the invention including a header, attribute tables, metadata and record data. The signature of the main OAB data file is calculated by computing the CRC-32 checksum over the entire file not including the OAB_HDR record. The seed value is 0xFFFFFFFF (−1). The display and addressing template files will not have a CRC-32 checksum in the OAB header when downloaded from the server. However the download from the server will have extra error checking available.

Client Index Implementation

In one embodiment for the client index implementation, the client index files are built from the server full OAB file after it is downloaded from the server or updated using the update mechanism (e.g., binpatch). A separate index file is built for each index that the client wants to use. At minimum an index file is build for the PR_DISPLAY_NAME attribute that corresponds to the browse file. An index file is built for the PR_ANR attribute that indexes all the values for all properties that are marked with the ANR flag. An index file is built for the PR_EMAIL_ADDRESS or PR_SMTP_ADDRESS record which is the primary key file that allows conversion to and from short term and long term entry-ids.

The start of each index file begins with the OAB_IDX_HDR structure. The ulVersion number is set to 33 decimal to indicate an index file format, the ulSignature is set to the same value as found in the full OAB data file so that index files cannot be used with the wrong data file, the ulRecords field will indicate the number of fixed size index records in the file, the ulPropTag field will indicate which property has been indexed in the file, and the ulSortLocale will indicate which sort locale was used to build the file.

```
Struct OAB_IDX_HDR {
    ULONG ulVersion;
    ULONG ulSignature;
    ULONG ulRecords;
    ULONG ulPropTag;
    ULONG ulSortLocale;
};
```

Following the OAB_IDX_HDR record are ulRecords number of OAB_IDX_REC records. These follow the following format:

```
Struct OAB_IDX_REC {
    ULONG oRecOffset;
    ULONG oValOffset;
};
```

The oRecOffset field indicates the absolute offset in the full OAB data file of the start of the OAB record. The oValOffset field indicates the relative offset in the full OAB data file from the start of the OAB record to the value indexed. For multi-valued properties this points at the value instance that was indexed as if it was a single valued property, not the start of the multi-valued property.

To display the GAL in order, the client needs to choose a starting position in the index file to begin the list, read each OAB_IDX_REC in order from the file, and use the offsets to read each OAB record in turn. Because it is using the sorted index, the records will come out in the correct sort order.

To search for entries in the index file, a binary search is performed. The client will choose the midpoint of the index file, retrieve the record pointed to by the oRecOffset member, read the value pointed to by the oValOffset, compare it with the search key and then choose whether to bisect the upper range or lower range depending on the comparison result.

Compressed File Format

Optionally, the compressed file format of the OAB files as posted on the server is the same as prior formats except that the compression algorithm is changed to the new LZX algorithm or other algorithm used by the update mechanism. The header block will follow the same format:

```
struct _oabhdr {
    unsigned long  ulVersionHi;
    unsigned long  ulVersionLo;
    unsigned long  ulBlockMax;
    unsigned long  ulUncompSize;
} OABHDR;
```

The ulVersionHi field is set to 3 to indicate LZX (binpatch) compression and distinguish it from 2 MDI (zip) compression and 1 mrcf compression. ulVersionLo is set to 1. ulBlockMax is set to the largest size of a compressed or uncompressed OAB block which is 256 kilobytes. This value is configurable on the server by registry key. ulTargetSize is set to what the resulting decompressed file size is.

Following the OABHDR record is a number of compressed data blocks. Each block will start with the following structure:

```
struct _lzxblk {
    unsigned long  ulFlags;
    unsigned long  ulCompSize;
    unsigned long  ulUncompSize;
    unsigned long  ulCRC;
} LZXBLK;
```

The ulFlags member will always be set to 1 to indicate the block is compressed and needs to be passed to the binpatch core to uncompress the block. If set to zero, the block is uncompressed and can be written directly to the uncompressed file.

The ulCompSize member indicates the size in bytes of the patch chunk to be read from the patch file that directly follows the structure. This is the data that should be passed to the binpatch core to decompress.

The ulUncompSize member indicates the size of the uncompressed block that will result from decompressing/patching the chunk. This is the exact size of the output buffer that is needed by the binpatch core to decompress the block and is the size of the record that needs to be written to the uncompressed file.

The ulCRC member indicates the CRC-32 checksum of the uncompressed block. This should be used by the client to test the results of the decompression code. The CRC-32 checksum is seeded with the value 0xFFFFFFFF (−1). This value has no relation to the CRC-32 signature contained in the OAB header for the fill OAB file.

The compressed file itself will end at the end of the last compressed data block and will not have any extra data. When the client reaches the end of the compressed file and decompresses the last block, it should then read the file again to generate the OAB signature as described in the previous section with the OAB signature in the OAB header section. The client could alternatively build the OAB signature as it decompresses the file.

Differential File Format

The differential file and compressed files as downloaded from the server are in a chunked format that is usable by the binpatch library. The binpatch library is used in a way that the window size is 256 kilobytes in size on the client. The compressed patch file will start with a header block similar to the OAB versions 2 and 3 compressed files.

```
struct _patchhdr {
    unsigned long  ulVersionHi;
    unsigned long  ulVersionLo;
    unsigned long  ulBlockMax;
    unsigned long  ulSourceSize;
    unsigned long  ulTargetSize;
    unsigned long  ulSourceCRC;
    unsigned long  ulTargetCRC;
} PATCH_HDR;
```

The ulVersionHi field is set to 3 to indicate LZX (binpatch) compression, ulVersionLo is set to 2 to indicate this is a differential patch file and not just an LZX compressed data file. ulBlockMax is set to the largest size of any compressed OAB patch block or any uncompressed source or target block. ulSourceSize is set to the size of the source file. If the value does not match the file on the client the result of the patching is undefined. ulTargetSize is set to what the resulting decompressed or patched file size is. The ulSourceCRC field is the CRC-32 OAB signature of the source file, and the ulTarget-CRC field is the CRC-32 OAB signature of the resulting patched file.

Each chunk of the patch file will start with the following structure:

```
struct _patchblk {
    unsigned long  ulPatchSize;
    unsigned long  ulTargetSize;
    unsigned long  ulSourceSize;
    unsigned long  ulCRC;
} PATCH_BLK;
```

The ulPatchSize member indicates the size in bytes of the patch chunk to be read from the patch file that directly follows the structure. This value can be zero.

The ulTargetSize member indicates the size of the uncompressed block that will result from decompressing/patching the chunk. This value can be zero.

The ulSourceSize member indicates the size of the chunk from the client source file that should be read and patched. This value can be zero. This chunk will also be passed to the binpatch api.

The ulCRC member indicates what the 0xFFFFFFFF (−1) seeded CRC-32 checksum of the resulting block should be after the patch is applied.

Client Side Multi-Day Patch Implementation

The client can use the binpatch api to efficiently implement a multi-day patch application that will not require the client to rewrite the entire OAB file N times. The client would download all the patch files before attempting the patching. The client would open each file, read the header and the first patch block from each. By maintaining a list of N input and output buffers, the client would read the first ulSourceSize block from the client source file into the first input block, apply the first patch block and put the output block into the input buffer of the next patch file. As each input buffer reaches the ulSourceSize limit of the next patch block, the output buffer can be written to the next stage. When the final output buffer has been filled, the output file can be written. If the client determines that the input buffer does not contain enough information for the next patch block, it looks at the previous set of input, output and patch blocks to attempt to fill more of the blocks. This would be iterated until it required that more data from the source file be read.

The server will create patch blocks so that both ulTargetSize and ulSourceSize are both less than or equal to the maximum block size. The following pseudo-code describes the algorithm. This code has a memory requirement of O(Max binpatch block size +N * Max input/output block size) where N is the number of days of patches to apply.

```
dim InFile, OutFile, PatchFile[N]
dim Patch[N], Input[N], Output[N]
dim p
p = 0
do
    if Patch[p] is empty then
        read PatchFile[p] -> Patch[p]
    end if
    if Patch[0].ulSourceSize < Input[0].size then
        read InFile -> Input[0]
    end if
    while Input[p].size >= Patch[p].ulSourceSize
        DoPatch Input[p], Patch[p] -> Output[p]
        remove Patch[p].ulSourceSize from Input[p]
        assign empty -> Patch[p]
        p=p+1
        if p == N then
            write Output[p-1] -> OutFile
            exit while
        else
            append Output[p-1] -> Input[p]
            if Patch[p] is empty then
                read PatchFile[p] -> Patch[p]
            end if
        end if
    end while
    p=p-1
until OutFile.size = finalSize
```

As a result, the server no longer needs to generate index files. That task has been transferred to the client. Only a single OAB must be generated for multiple client locales rather than requiring a separate OAB server for each client locale needed.

Exemplary Operating Environment:

FIG. 8 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 8 illustrates operating system 144, application programs 146, other program modules 148, and program data 150.

The computer 130 may also include other removable/non-removable, volatile/nonvolatile computer storage media. For example, FIG. 8 illustrates a hard disk drive 154 that reads from or writes to non-removable, nonvolatile magnetic media. FIG. 8 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 8, provide storage of computer readable instructions, data structures, program modules and other data for the computer 130. In FIG. 8, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 8 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 8 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein. The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it is seen that the several objects of the invention are achieved and other advantages results attained. As various changes could be made in the above constructions, products, and methods without departing from the scope of the invention, it is intended that all matter contained in the above description and shown in the accompanying drawings shall be interrupted as illustrative and not in a limiting sense.

What is claimed is:

1. A computer-implemented method of building and maintaining an offline address book (OAB), wherein the OAB allows a plurality of client computers to individually access address information when working offline, the method comprising:
   periodically generating an OAB data file at a server computer on an administrator defined schedule;
   transferring the OAB data file from the server computer to a first client computer for indexing the OAB data file according to a first sort locale, the first sort locale defining a sort order of words and a text of a language;
   transferring the OAB data file from the server computer to a second client computer wherein the second client computer indexes the OAB data file according to a second sort locale, the second sort locale defining a sort order of words and a text of a language, the second sort locale having a different value than the first sort locale;
   generating a first customized indexed file at the first client based upon a first set of one or more attributes of the OAB data file;
   generating a second customized indexed file at the second client based upon a second set of one or more attributes from the OAB data file wherein the first set of one or more attributes from the first customized index file are different from the second set of one or more attributes from the second customized index file; and
   generating a differences file between a previous version of the OAB data file and a next version of the OAB data file using an update mechanism, wherein each of the plurality of client computers which have previously received the previous version are transferred only the differences file.

2. The computer implemented method of claim 1 further comprising a table of indexable attributes.

3. The computer implemented method of claim 1 wherein each of the first customized index file and the second customized index file comprises a header including at least one of a version number and a signature value.

4. The computer implemented method of claim 3 wherein the version number distinguishes between different OAB file types and the signature value is a hash value computed from the OAB data file so that each of the plurality of client computers can confirm that the file used as the index file matches the OAB data file.

5. The computer implemented method of claim 4 wherein an index record is generated for each value of a multi-valued attribute stored in the OAB data file.

6. The compluter implemented method of claim 3 wherein an index record is generated for each value of a multi-valued attribute stored in the OAB data file.

7. The computer implemented method of claim 1 wherein indexing for each attribute at each of the plurality of client computers comprises:
   reading, in order, each of a plurality of records in the OAB data file;
   adding an attribute value to an in-memory table; and
   after the entire OAB data file is read, sorting the in-memory table and writing out an index file.

8. The computer implemented method of claim 1 wherein a format of the OAB data file comprises the following: an OAB header, an attribute table, and a plurality OAB records.

9. The computer implemented method of claim 1 wherein during indexing each of the plurality of client computers truncates one or more overly long property strings, removes one or more overly long binary values, and limits a number of values in a multi-valued attribute in order to minimize the size of the OAB data file.

10. The computer implemented method of claim 9 wherein information about which properties were truncated or removed is a constructed multi-valued long property in the OAB data file and wherein the information contains a list of property tags that have been truncated or limited by the server computer.

11. The computer implemented method of claim 1, wherein the first customized index file comprises:
   a header structure comprising a version number that distinguishes between different OAB file types; and
   an offset into the OAB data file.

12. The computer implemented method of claim 1, wherein the OAB data file comprises the following:
   an OAB header, an attribute table, and a plurality of OAB records.

13. The computer implemented method of claim 1, wherein generating the OAB data file further comprises truncating properties to limit the size of the OAB data file.

14. The computer implemented method of claim 13, further comprising maintaining a list of properties that have been truncated.

15. The computer implemented method of claim 1, wherein the OAB data file is compressed.

16. A computer readable storage medium including computer executable instructions for maintaining an offline address book (OAB), wherein the OAB allows a plurality of client computers to individually access address information when working offline, the instructions comprising:

periodically generating an OAB data file at a server computer on an administrator defined schedule;

transferring the OAB data file and from the server computer to a first client computer wherein the first client computer indexes the OAB data file according to a first sort locale, wherein the first sort locale defines a sort order of words and a text of a language;

transferring the OAB data file from the server computer to a second client computer wherein the second client computer indexes the OAB data file according to a second sort locale, wherein the second sort locale defines a sort order of words and a text of a language, the second sort locale having a different value than the first sort locale;

generating a first customized indexed file to be used by the first client computer;

generating a second customized indexed file to be used by the second client computer, wherein the second customized index file is different from the first customized index file; and generating a differences file between a previous version of the OAB data file and a next version of the OAB data file using an update mechanism, wherein each of the plurality of client computers which have previously received the previous version are transferred only the differences file.

* * * * *